(12) United States Patent
Mazur et al.

(10) Patent No.: US 6,650,910 B1
(45) Date of Patent: Nov. 18, 2003

(54) METHODS AND APPARATUS IN ANTENNA DIVERSITY SYSTEMS FOR ESTIMATION OF DIRECTION OF ARRIVAL

(75) Inventors: Sara Mazur, Bromma (SE); Bo Hagerman, Stockholm (SE); Ulf Forssén, Saltsjö-Boo (SE); Sören Andersson, Sollentuna (SE); Fredrik Ovesjö, Solna (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 527 days.

(21) Appl. No.: 09/196,117

(22) Filed: Nov. 20, 1998

(30) Foreign Application Priority Data

Nov. 21, 1997 (SE) .............................................. 9704282

(51) Int. Cl.[7] ................................................. H04Q 7/20
(52) U.S. Cl. ..................... 455/562; 455/277.1; 370/334; 342/375
(58) Field of Search .......................... 455/277.1, 277.2, 455/276.1, 562, 561; 342/375; 375/206, 349; 370/334

(56) References Cited

U.S. PATENT DOCUMENTS

| | | | | |
|---|---|---|---|---|
| 5,563,610 A | * | 10/1996 | Reudink ................... | 455/277.1 |
| 5,581,260 A | | 12/1996 | Newman | |
| 5,649,287 A | * | 7/1997 | Forssen et al. .............. | 455/273 |
| 5,684,491 A | * | 11/1997 | Newman et al. .......... | 455/277.2 |
| 5,907,816 A | * | 5/1999 | Newman et al. ............ | 455/562 |
| 5,926,503 A | * | 7/1999 | Kelton et al. ............ | 455/276.1 |
| 6,023,607 A | * | 2/2000 | Siira ........................... | 455/562 |
| 6,073,032 A | * | 6/2000 | Keskitalo et al. ........... | 455/561 |
| 6,275,482 B1 | * | 8/2001 | Jevremovic et al. ........ | 370/334 |

FOREIGN PATENT DOCUMENTS

| | | |
|---|---|---|
| EP | 0 622 911 A2 | 11/1994 |
| EP | 0 724 166 A2 | 7/1996 |
| WO | WO 93/12590 | 6/1993 |
| WO | WO 96/00466 | 1/1996 |
| WO | WO 96/22646 | 7/1996 |
| WO | WO 96/37973 | 11/1996 |
| WO | WO 96/37975 | 11/1996 |
| WO | WO 96/37976 | 11/1996 |

OTHER PUBLICATIONS

"Direction–of–Arrival Estimation and Detection Using Weighted Subspace Fitting", M. Viberg et al., pp. 604–608.

* cited by examiner

Primary Examiner—Edward F. Urban
Assistant Examiner—Tilahun Gesesse

(57) ABSTRACT

The present invention relates to radio systems and, more particularly, to a method and apparatus for receiving radio signals with the aid of beams generated by antenna assemblies. For each of the beams in a first of the antenna assemblies there is a beam in the second of the antenna assemblies that covers the same space area. Signals received by the second are delayed relative to signals received by the first of the antenna assemblies. Then signals from the first antenna assembly are combined with signals from the second of the antenna assemblies. The combined signals derive from beams covering the same space area. Each combined signal is then radio received in a joint radio receiver. A DOA-estimation can be calculated on the basis of radio received signals derived from all beams.

31 Claims, 4 Drawing Sheets

METHODS AND APPARATUS IN ANTENNA DIVERSITY SYSTEMS FOR ESTIMATION OF DIRECTION OF ARRIVAL

FIELD OF THE INVENTION

The present invention relates to radio systems and, more particularly, to a method and apparatus for receiving radio signals with the aid of antenna beams.

DESCRIPTION OF THE BACKGROUND ART

The quality of a received radio signal is affected by many natural phenomena.

One of these phenomena is time dispersion, which is caused by a signal on its way from a transmitter being reflected by obstacles at different locations in the propagation path before reaching the receiver. The signal will arrive at the receiver at different time delays, due to the different propagation paths along which the signal travel. With the introduction of digital coded data in radio systems, time dispersed signals can be successfully restored. It is well known to a person skilled in this art to use a RAKE-receiver or an equalizer to restore a time dispersed signal.

Another phenomenon, called fast fading or Raleigh fading, is caused by the signal being scattered on its way from the transmitter to the receiver by objects in a near distance from the transmitter or receiver. Thus, different signal versions that are slightly shifted in phase in relation to each other are received. In area spots where the phase differences are unfavorable, the sum of the received versions of the signal is very low, even close to zero. This results in a fading dip wherein the received signal virtually disappears. Fading dips occur frequently with a distance in the same order as the wavelength. For the 900 megaherz radio band the distance between two fading dips may be in the order of 15–20 cm. In case of a moving transmitter or receiver, the time that elapses between two successive fading dips as a result of fast fading depends on both the carrier frequency of the signal and the speed of the transmitter in relation to the receiver.

One well known method of combatting fading is to provide the radio receiving station with an antenna diversity system. The system comprises two or more receiving antennas separated either spatially or by orthogonal polarization directions, or by a combination thereof. As a result fading of the signals received by each antenna are less correlated, thus decreasing the possibility of both antennas being exposed to a fading dip at one and the same time. To enable radio reception of both signals received by the antenna diversity arrangement the radio receiver station is provided with separate receiver branches for each receiving antenna.

A third phenomenon troublesome to radio transmission is that of interference. An interfering signal can be characterized as any undesired signal received on the same channel as the desired signal. For military radio systems the most important interference to combat is jamming, i.e. intentional disturbance by the enemy. For cellular radio systems the interference problem is closely related to the capacity demand for communication. As the radio spectrum is a scarce resource, a radio frequency band given to a cellular operator must be used efficiently. For this reason the operators service area is divided into cells and radio channels used in one cell are reused in cells that have a minimum number of cells in-between. Because of the popularity of mobile phones, the demand for traffic capacity has grown rapidly. One way of handling the capacity demand is to decrease the size of the cells, thus enabling closer reuse of the channels per area unit and thereby raising the communication capacity of a given area while still preserving the frequency-reuse-factor.

In areas where the capacity demand is high, such as in city centres and railway stations, it is often difficult to find sites for base stations. An available place for a base station may have the form of a wall on which it can be hung. In the case of sites of this nature, it is important that the radio base station is small and demands less power. The size of the radio base station is related to the power consumption, since power necessitates cooling and cooling necessitates space. The appearance of the installation is also important, for instance with respect to obtaining permission from the authorities to use a new radio base station site.

Because of the increasing popularity of cellular systems there is a need to find new ways to combat interference, and thereby also enable higher traffic capacity. For this reason the use of adaptive antennas in radio base stations in cellular systems has been met with great interest, though not yet implemented in any commercial system. An adaptive antenna is commonly comprised of an antenna array connected to beam forming means. The adaptive antenna forms a set of antenna beams which each covers a narrow pre-defined space area and which together cover a wide pre-defined area omnidirectionally or within a sector. A signal sent from a mobile transmitter is received by each of the antenna beams, each version of the signal being separately received and thereby the angular information being maintained. The angular information is inherent in the phase difference between the different versions of the signal. An estimation of the direction to the signal source is made on the basis of the demodulated versions of the received signal. This estimated parameter is also called DOA, direction of arrival.

To enable the estimation of the DOA, signals received by each beam must be received separately by corresponding radio receiver branches.

The DOA-estimation is used for the selection of one or more antenna beams, or for directing of a narrow steerable beam, for transmission in the downlink to the mobile of interest. Transmission in the chosen beam is directed to the mobile station whereby mobiles that use the same channel in other directions will be less exposed to interference. Downlink interference is thus combated by means of the adaptive antenna technique.

One method of contending with fading and with the results of interference is to cause a radio channel frequently to change its carrier frequency. This method is called frequency hopping and is used with some success in the GSM-system. Patent publication U.S. Ser. No. 08/768319, adresses in respect of frequency hopping systems a problem that resides in the coherence bandwidth being wider than the frequency bandwidth available for operation. This implies that carrier frequencies used for frequency hopping have a correlated fading. Thus the purpose of frequency hopping to combat fading can not be achieved. The solution proposed in U.S. Ser. No. 08/768319 invovles producing a smaller coherence bandwidth by introducing an artificial delay spread. One way of producing the artificial delay spread is to receive a signal on two antennas, delay the signal received by a first of the antennas and then combine the delayed signal with the signal from the second of the antennas. The two combined signals are then fed to one receiver.

U.S. patent specification, U.S. Pat. No. 5563610, addresses the use of a multi-beamforming antenna for the purpose of gaining antenna diversity based on the different beams being very narrow and covering disjunct areas. This is called angular diversity and results in the signals received in separate beams being uncorrelated. For this purpose U.S. Pat. No. 5563610 teaches a receiving system in which branches from each antenna beam are distributed into two groups. In one group signals are delayed in relation to one another and then combined. Two combined signals, each derived from a corresponding of the two groups, are thus obtained and then fed to a conventional CDMA-receiver.

In this receiver the angular information is lost after the signals have been combined. It is thus impossible to make a DOA-estimation and by means of beamforming combat downlink interference.

SUMMARY OF THE INVENTION

The present invention addresses a problem arising when both an enabling of accurate DOA-estimation and antenna diversity shall be provided in a radio receiver comprising a limited number of radio receiver branches. The limited number of radio receiver branches results in a trade-off between the accuracy of the DOA estimation and the performance of the antenna diversity reception. If all the receiver branches are used in the DOA estimation process, the lack of protection against fading will lower the performance of the DOA estimation. If, on the other hand, the diversity gain is to be maintained by separate reception of less correlated signals, the number of beams that can be received separately will be reduced and thus also the accuracy of the DOA estimation.

Another problem is to produce a radio base station comprising a radio receiver system that is small, has low power consumption and has antenna diversity as well as means for estimating DOA. It will be remembered that receiver branches need space and are power consuming.

The object of the present invention is to make reception possible both by antenna diversity and by antenna beams to enable an accurate estimation of DOA, and to combat fading in a receiver that includes only a moderate number of receiver branches and thus achieve the aim of providing a radio station that is both compact and requires less power.

The essence of the present invention is the introduction of an artificial time dispersion in a set of signals received by antenna diversity and by different antenna beams. Sets of signals received by different antenna assemblies are delayed relative to one another and signals that derive from beams covering the same space area are combined. For each of the beams in the first antenna assembly there is a beam in each of the other antenna assemblies that covers the same space area. In this way the angular information is maintained. Each combined signal is then radio received in a joint radio receiver. A DOA-estimation can be calculated on the basis of radio received signals derived from all beams. Both the natural and artificial time dispersion of the radio received signals can be restored in an equalizer or a Rake-receiver. By the inventive combination of signals the energy from each of the combined signals is maintained until the signals reach the equalizer or Rake-receiver. The energies from the different time dispersed signals are merged together in the equalizer or in the Rake-receiver. If the energy of one of the combined signals is low temporarily due to a fading dip at the corresponding receiving antenna the energy of the signal received by the other antenna will compensate for the fading dip.

More precisely, the present invention solves the aforementioned problems by means of a method in which signals are received by at least two antenna assemblies that are separated to achieve antenna diversity, i.e. the antenna assemblies are separated spatially or by different polarization directions. Each of the antenna-assemblies generates a set of antenna beams. The antenna assemblies are constructed so as to generate mutually corresponding sets of antenna beams, i.e. the beams have corresponding angular coverages and a particular area is covered by two beams, one from each of the antenna assemblies. Signals received by separate antenna assemblies in corresponding antenna beams are then mutually combined after having been delayed in relation to one another. An artificial multipath propagation is thus created in respect of the combined signal. The combined signal is then fed to one radio receiver branch for frequency transformation from RF to a lower frequency and demodulation, whereupon the artificial time dispersion can be restored by digital signal processing in an equalizer or a RAKE-receiver for instance. A DOA-estimation can be calculated on the basis of the outputs from several radio receiver branches to which signals are fed from separate beams.

The present invention is also related to a radio receiver system which solves the aforementioned problems. The radio receiver system comprises at least two antenna assemblies which are mutually separated to achieve antenna diversity. Each of the antenna assemblies generates a set of antenna beams, where each beam covers a narrow space area and the beams together cover an specific area omnidirectionally or within whithin a sector. The different sets of beams correspond to each other, and one space area is covered by a beam from each of the antenna assemblies. Delay elements are connected to all but one of the antenna assemblies. The delay elements delay signals received by a corresponding antenna assembly. The delay is given a separate value for each antenna assembly. A number of combiners are connected to the delay elements and also to that antenna assembly which is without delay element. Each of the combiners receives from each of the antenna assemblies signals from corresponding beams. Each combiner output is connected to a corresponding receiver branch.

The invention constitutes an improvement in the known art by virtue of the fact that one radio receiver branch can be fed with signals from several antenna assemblies, whereafter the signals can be restored. Thus the required number of radio receiver branches to achieve both antenna diversity gain and to enable the calculation of an accurate DOA estimation is limited to correspond to the number of beams in the set of antenna beams. This enable both the size of the radio receiver and its power consumption to be reduced.

A further improvement is found in respect of sites in which a base station comprising the inventive radio receiver is placed on the ground and the antenna assemblies are mounted on a mast. The weight of the cables connecting the base station with the antenna assemblies is an important factor in respect of mast dimensions. The number of cables connecting the base station to the antenna assemblies can be reduced by coupling the combiners close to the antenna assemblies. Thereby the weight of the cables is reduced which will allow a mast to have smaller dimensions and therewith lower the cost of the mast as well as the cables.

The invention will now be described in more detail with reference to preferred embodiments thereof and also with reference to the accompanying drawings.

DETAILED DESCRIPTION OF PREFERRED EMBODIMENTS

Figure 1:
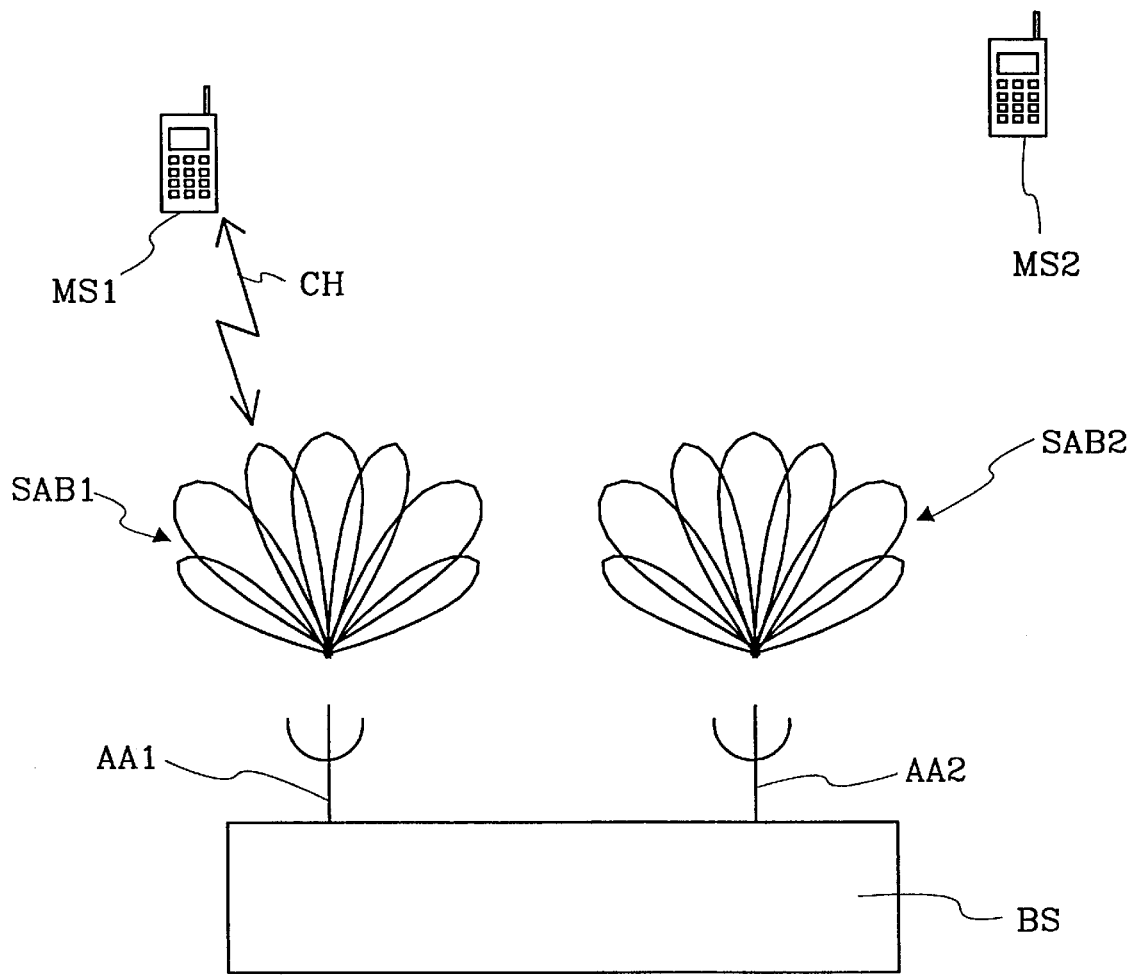
FIG. 1 illustrates two mobile stations and a radio base station comprising two antenna assemblies.

In FIG. 1 there is shown two mobile stations MS1 and MS2 and a base station BS that includes an inventive radio receiver. A radio channel CH is used for communication between the first mobile station MS1 and the radio base station BS. The radio channel CH is also used by the second mobile station MS2 for communication with another base station, not shown in FIG. 1.

The radio base station BS is equipped with two antenna assemblies AA1, AA2. The antenna assemblies AA1, AA2 are separated to achieve antenna diversity. Both cover a 120° sector with a number of beams. The first antenna assembly AA1 generates a first set of antenna beams SAB1 and the second antenna assembly AA2 generates a second set of antenna beams SAB2. For each of the beams in the first set SAB1 there is a corresponding beam in the second set of beams SAB2 covering the same space area, i.e. the two beams are overlaid. The space area in which the first mobile MS1 is placed is covered by a beam in each of the sets of beams SAB1, SAB2, and the direction to the second mobile MS2 is covered by an other beam.

Signals derived from different beams are separately received in the receiver, thereby maintaining the angular information. A DOA estimation estimating the direction to the first mobile station MS1 can be made with the aid of these signals.

Downlink interference is decreased by transmission in a beam directed to the first mobile station MS1, thereby improving the downlink quality for the second mobile station MS2. The downlink beam is selected on the basis of the DOA estimation of the first mobile station MS1.

The antenna diversity arrangement improves the uplink quality by reducing the risk of both the antenna assemblies being exposed to a deep fading dip at the same time.

An embodiment of the inventive radio receiver for a TDMA system will be described with reference to FIG. 2. The radio receiver RRC comprises two antenna assemblies AA1, AA2. Each of the antenna assemblies AA1, AA2 comprises an antenna array AAR formed by a number of antenna elements AEL, low noise amplifiers LNA connected to the antenna elements AEL, and beam forming means BM with connections from the low noise amplifiers LNA. The antenna elements AEL of the first antenna assembly AA1 are given an orthogonal polarization direction relative to the polarization direction of the antenna elements AEL of the second antenna assembly AA2.

In this embodiment the beam forming means BM consists of a Butler matrix. The Butler matrix BM has a number of outputs, each corresponding to an antenna beam.

The radio receiver RRC also comprises a number of delay elements DLM, a number of combiners CMB, a number of radio receiver branches RX, a DOA estimator DP and an equalization and signal estimation unit EqSE.

Each output of the Butler matrix BM of the second antenna assembly AA2 is connected to a corresponding delay element DLM. Each output of the delay elements DLM is connected to a corresponding combiner CMB. Each combiner CMB also has an other connection from the Butler matrix BM of the first antenna assembly AA1. The two inputs to a combiner corresponds to beams covering corresponding space area.

The output of each combiner CMB is connected to a corresponding radio receiver branch RX. The radio receiver branch RX comprises channel selection, and frequency transformation from RF to base band.

Outputs of all the radio receiver branches RX are connected to the equalization and signal estimation unit EqSE. In this embodiment the equalization unit comprises an MLSE, Maximum Likelihood Sequence Estimation, and means for combination of received signals derived from different beams.

The outputs of the radio receiver branches RX are also connected to the DOA-estimator DP. A DOA-estimator is well known to a person skilled in the art, see e.g. "Direction-of-arrival estimation and . . . ", by authors Viberg, Ottersten and Kailat, in proc. 23rd Asilomar Conf. Signal, Syst., Comp., Nov. 1989.

Another embodiment of the inventive radio receiver RRC for use in a direct sequence CDMA-system will now be described with reference to FIG. 3. The inventive radio receiver RRC comprises two antenna assemblies AA1, AA2. The antenna assemblies AA1, AA2 comprise the same parts as the antenna assemblies AA1, AA2 in the earlier described embodiment with reference to FIG. 2. A difference, however is, that the two antenna arrays AAR are not given orthogonal polarization directions but are spatially separated by approximately 10–20 wavelengths.

The radio receiver RRC also comprises a number of delay elements DLM, a number of combiners CMB, a number of radio receiver branches RX, a Rake-receiver RAKE, and a DOA-estimator DP.

The antenna assemblies AA1, AA2 have a number of outputs each corresponding to a beam. Each of the outputs of the second antenna assemblies is connected to a corresponding delay element DLM. Each of the outputs of the delay elements DLM is connected to a corresponding combiner CMB. To each of these combiners CMB is also connected an output from the first antenna assembly AA1. The beams corresponding to the two inputs at the combiner CMB cover the same space area.

The outputs from the combiners CMB are connected to corresponding radio receiver branches RX. The radio receiver branches RX have been described with reference to the FIG. 2 embodiment.

The outputs from the radio receiver branches RX are connected to a Rake-receiver RAKE. The Rake-receiver RAKE comprises means for combining signals radio received by different radio receiver branches RX, e.g. through Maximum Ratio Combining, MRC. The Rake-receiver RAKE performs Rake-combining of delayed signals. Both Rake-combining and MRC are teqniques well known to a person skilled in the art.

The outputs of the radio receiver branches RX are also connected to a DOA estimator DP. For further discription of DOA-estimation in a Rake-receiver, see the document, Ayman F Naguib, Adaptive Antennas for CDMA Wireless Networks, PhD Thesis, Dep of EE Stanford University.

The described embodiments have illustrated two methods of obtaining antenna diversity, by spatial separation and by orthogonal polarization direction of the antenna elements AEL respectively. The multiple access methods, TDMA or CDMA, can use both methods or a combination of the two methods to obtain antenna diversity.

An inventive method will now be described with reference to FIG. 4, in which method two sets of signal sequences are received by two sets of antenna beams. The two sets of antenna beams are supplied by two antenna assemblies that are separated to achieve antenna diversity. Each of the beams in the first set of antenna beams covers the same space area as a corresponding beam in the second set, and the two beams are thus overlaid. Each signal sequence in a set of signal sequences corresponds to an antenna beam. This stage is represented by the block B1 in the flow chart of FIG. 4.

Figure 4:
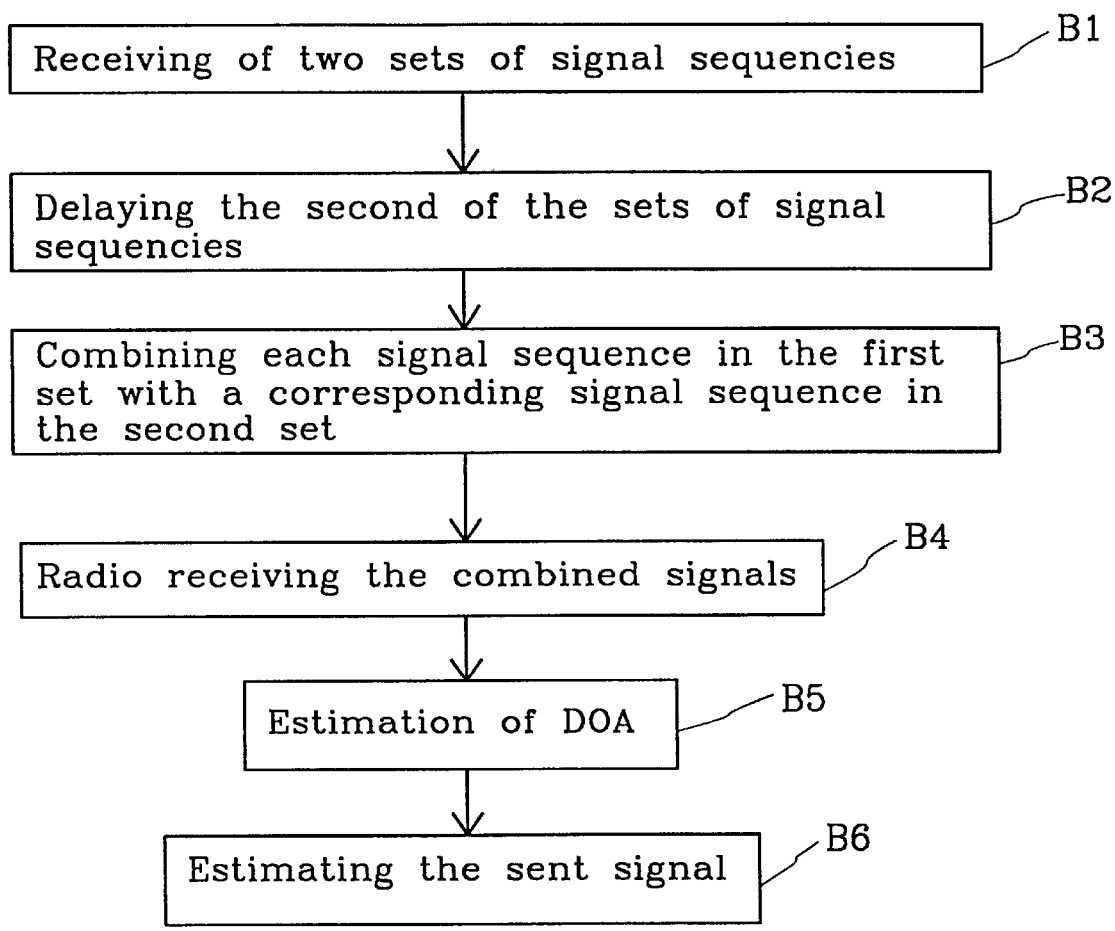
FIG. 4 is a flow diagram illustrating a radio receiving method.

The second set of signal sequences is delayed, which in FIG. 4 is represented by the block B2.

Each signal sequence of the first set of signal sequences is then combined with a corresponding signal sequence from the delayed second set of signal sequences. The two combined signal sequences both derive from beams covering the same space area. This stage is represented by the block B3 in the flow sheet of FIG. 4. An artificial time dispersion is thus introduced into the combined signal sequence.

Each combined signal sequence is separately radio received, which includes channel selection, and frequency transformation from RF to base band level. This stage is represented by the block B4 in the flow sheet of FIG. 4.

A DOA-estimation is carried out on the basis of the received signal sequences derived from a number of antenna beams. This stage is represented by the block B5 in the flow sheet of FIG. 4.

The energy of each combined signal which has been spread in time by the time dispersion is merged together in an equalizer or in a Rake-receiver and an estimation of the signal sent from the first mobile MS1 is then made. By use of a known combining method, for example, MRC, the signal estimation will be based on the radio received signal sequences derived from a number of antenna beams. This stage is represented by the block B6 in the flow sheet of FIG. 4.

Two receiving antenna assemblies have been used in the described embodiments. This is a minimum number when antenna diversity shall be achieved. More than two antenna assemblies may be used when wishing to achieve a higher order of antenna diversity for instance. More than two antenna assemblies are also used if a combination of diversity methods shall be accomplished. According to the inventive method a set of signal sequences derived from yet another antenna assembly is delayed in relation to the sets of signals derived from the other antenna assemblies. The signal sequences, derived from beams covering the same space area, are delayed relative to one another and then combined and radio received according to the inventive method described above.

If a third or more antenna assemblies AA1, AA2 are added to the inventive radio receiver RRC, delay elements DLM are connected to the output of these antenna assemblies and the output of each delay element DLM is connected to a combiner in the same way as the second antenna element. Thus, all inputs to a combiner are associated beams covering tha same space area. For each of the antenna assemblies AA1, AA2 to which delay elements DLM are connected these delay elements DLM produce a delay which is significant for the antenna assembly AA1, AA2. Signal sequences fed to the combiner are thus delayed relative to one another.

The relative delay between two combined signal sequences must be long enough for the equalizer or the Rake-receiver to be able to resolve. For an equalizer in the GSM-system this delay should be in the order of 2.5 symbol times and for an equalizer in a radiosystem according to the IS 136 standard the delay should be in the order of 0.5–1 symbol time. For a Rake-receiver, the delay should be about a few chiptimes of the spreading sequence. If more signals are to be combined this difference in delay should be introduced between two consecutively delayed signals.

In this context the antenna assemblies are referred to as being separated to achieve antenna diversity. By antenna diversity is meant that signals are received independently via at least two antenna arrays separated spatially or by mainly orthogonal polarization directions or by a combination thereof. For receiving by orthogonal polarization directions it is not necessary to spatially separate the antenna elements. In fact there are antennas designed in one unit which facilitates simultaneous receiving in two separate polarization directions.

Signals received by an antenna diversity arrangement are often improperly referred to as being uncorrelated. The reason why this reference is improper is because the signals concerned are sent from the first mobile station MS1 and are thus completely correlated. However, the signals are affected by different propagation paths in their travel to the receiving antenna diversity arrangement. The object of the antenna diversity arrangement is to decrease the degree of correlation of the influences on the received signals that is caused by the different propagation paths. Expressed differently, the object of the antenna diversity arrangement is to decrease the correlation degree of the fading of the different signals and thereby reduce the possibility of all antenna assemblies being exposed to a deep fade at one and the same time.

In practice it is not possible to achieve completely uncorrelated fading of the signals received by the antenna diversity arrangement. One reason is because the antenna arrays cannot be spaced too far apart. However, this does not present a problem because a moderate reduction of the correlation of the fading is enough to make a significant improvement in the uplink radio quality. In practice a common correlation factor of the fading, to which an antenna diversity arrangement is exposed, is about 0.7, on a scale from 0–1, where 0 means no correlation at all, and 1 means complete correlation of the received signals.

Figure 2:
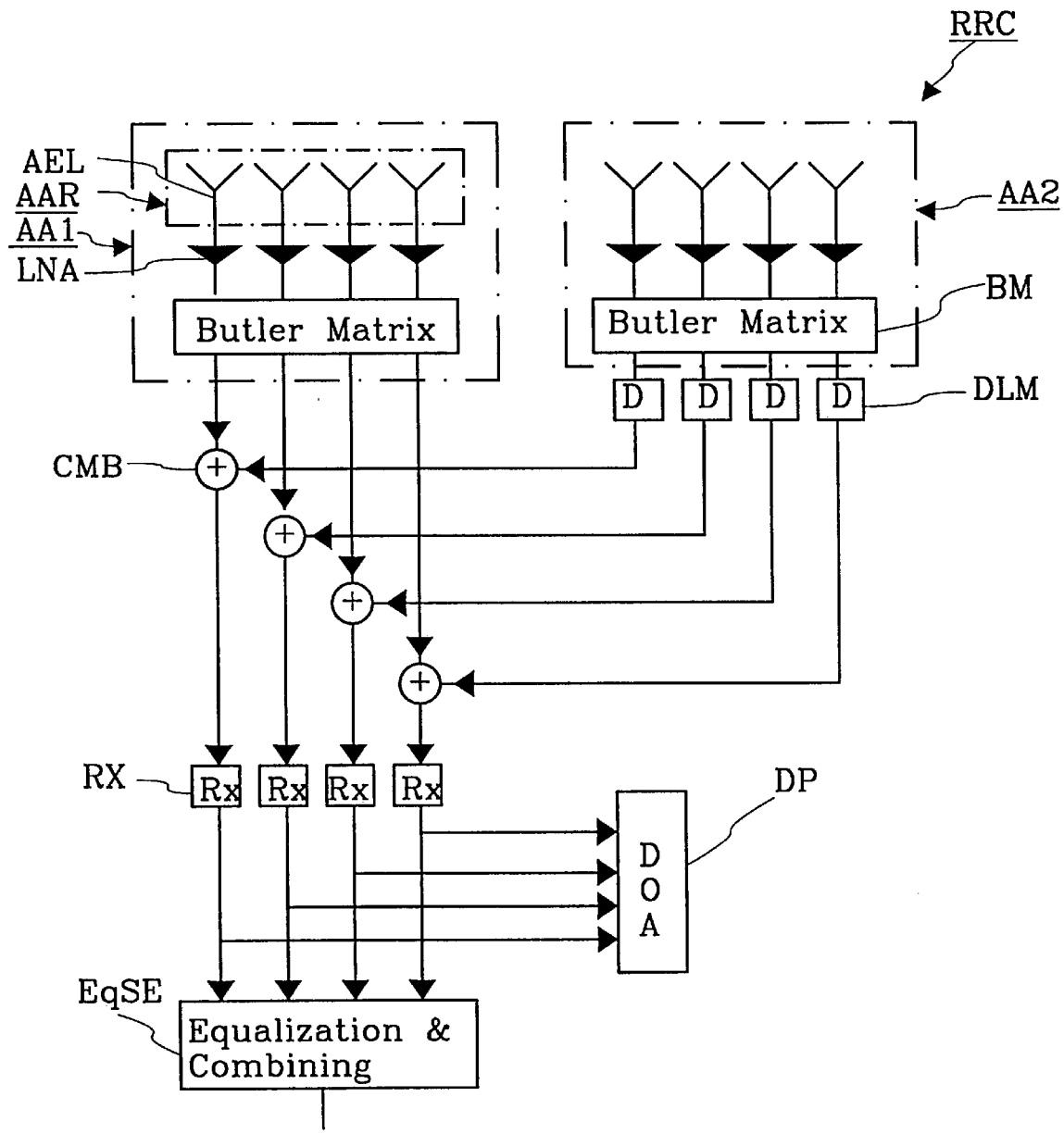
FIG. 2 is a block schematic illustrating a radio receiver according to the invention.
Figure 3:
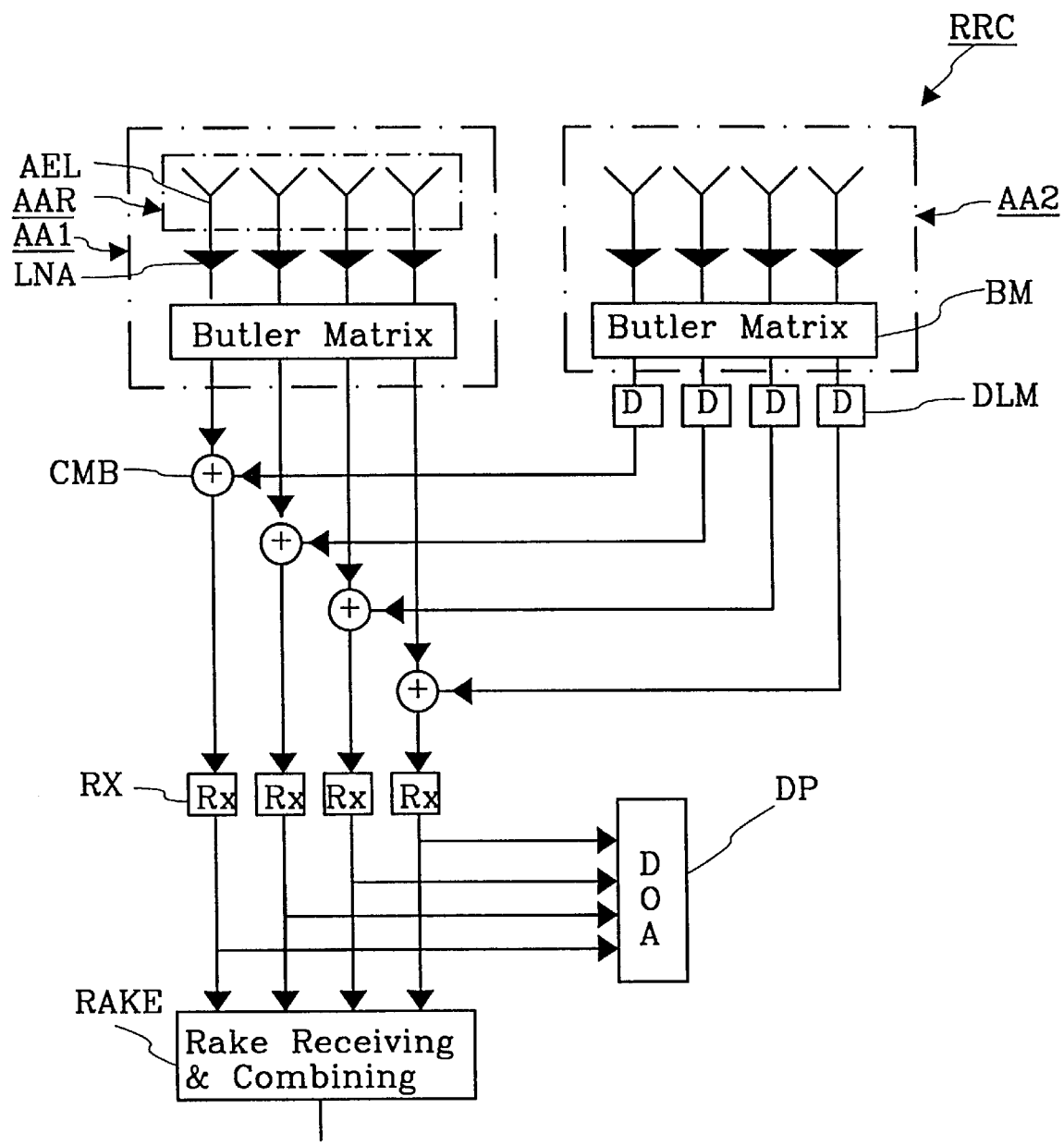
FIG. 3 is a block schematic illustrating another radio receiver according to the invention.

The low noise amplifiers LNA connected to the antenna elements AEL shown in FIG. 2 and FIG. 3 serve to reduce the impact of noise introduced by the receiver on the signal. The use of low noise amplifiers connected to the antenna elements AEL for this purpose is well known.

The delay elements DLM connected to the second antenna assembly AA2 with reference to FIG. 2 and FIG. 3 may consist of saw-filters or fiber-cables. In either case the delay elements DLM may cause an attenuation of the received signal strength. This attenuation caused by delay elements DLM is preferably compensated for by a corresponding increase in the amplification of the low noise amplifiers LNA of the second antenna assembly AA2, to allow the signals combined at the combiner CMB to be exposed to equivalent amplification within the receiver. If the delay elements DLM of the second antenna assembly AA2 give an amplification −D dB of the signal strength of the received signals and the low noise amplifiers LNA of the first antenna assembly AA1 give an amplification A dB to the received signals, the amplification of low noise amplifiers LNA of the second antenna assembly AA2 should be A+D dB to compensate for the attenuation of the delay elements.

In a base station BS comprising the inventive radio receiver RRC, the combiners CMB should preferably be placed near the antenna assemblies (AA1, AA2). Especially for sites where the base station BS must be placed far from the antenna assemblies (AA1, AA2) this is an improvement as the number of connecting cables is thereby reduced. The costs, weight and space for the cables required are thereby also reduced.

In the aforedescribed embodiments, the radio receiver RRC and inventive method have been used for two principles of multiple access of the radio spectra, i.e. TDMA and CDMA. It will be understood that the invention is not restricted to these two principles for multiple access, and that the invention can be applied also for other principles for multiple access.

What is claimed is:

1. A receiver system comprising,
    at least two antenna assemblies each providing a set of antenna beams and for each beam in a first of said sets of antenna beams there is a corresponding beam in the second of said sets of antenna beams covering a corresponding space area,
    delay elements connected to outputs of at least one of said antenna assemblies;
    combiner devices, each with inputs connected, either directly or via said delay elements, to outputs of said antenna assemblies, said combiner devices each combining received signals derived from corresponding beams; and
    radio receiver branches each connected to an output of a corresponding combiner device and leading to a radio receiver.

2. A receiver system according to claim 1 wherein the antenna assemblies are spatially separated to achieve antenna diversity.

3. A receiver system according to claim 1 wherein the antenna assemblies have different polarization directions to achieve antenna diversity.

4. A receiver system according to claim 1 wherein the antenna assemblies are separated by a combination of spatial and polarization means to achieve antenna diversity.

5. A receiver system according to claim 2 wherein the typical spatial separation between the antenna assemblies is in the order of 10–20 wavelengths.

6. A receiver system according to claim 1, wherein the delay elements are adapted to produce a delay that is specific for each connected antenna assembly.

7. A receiver system according to claim 6, wherein the difference in delay corresponding to two antenna assemblies is at least half a symbol time for a TDMA system.

8. A receiver system according to claim 6, wherein the difference in delay corresponding to two antenna assemblies is at least one chip time of a CDMA spreading sequence.

9. A receiver system according to claim 1, further comprising:
    a number of outputs from each of the antenna assemblies, each output corresponding to an antenna beam, and wherein each of the outputs of at least all but one of the antenna assemblies is connected to a corresponding delay element.

10. A receiver system according to claim 1, wherein,
    the radio receiver system further includes two antenna assemblies, delay elements connected to a second of said antenna elements, a number of combiners each with an input connected to the first antenna assembly and another input connected to one of said delay elements, both inputs corresponding to antenna beams mainly covering the same space area.

11. A receiver system according to claim 1, further comprising:
    a device for computing channel estimation and signal estimation, said device having an input with connections from said receiver branches.

12. A receiver system according to claim 11, wherein, said device is a time equalizer.

13. A receiver system according to claim 11, wherein said device is a Rake-receiver.

14. A receiver system according to claim 1, further comprising:
    a DOA-estimator for computing a DOA estimate and having an input with connections from said receiver branches.

15. A receiver system according to claim 1, wherein,
    said radio receiver branches comprises a channel selection filter, and a frequency mixer that transforms the channel from RF to a lower frequency.

16. A receiver system according to claim 1, wherein,
    each of said antenna assemblies comprises an array of antenna elements, amplifiers connected to each antenna element and beam forming means.

17. A receiver system according to claim 16 wherein, the amplification of the amplifiers is adjusted to compensate for attenuation caused by the delay elements.

18. Radio receiving method comprising the steps of:
    providing a first set of antenna beams comprising a first antenna beam covering a specific space area,
    providing a second set of antenna beams comprising a second antenna beam covering said specific space area,
    delaying received signals derived from said second set of antenna beams, in relation to received signals derived from said first set of antenna beams,
    combining said signals derived from said first antenna beam and said second antenna beam, and
    radio receiving said combined signals in one receiver branch.

19. A method according to claim 18 wherein,
    the correlation between the fading pattern of said signals derived from said first set of antenna beams and the fading pattern of the signals derived from said second set of antenna beams, is reduced by means of antenna diversity.

20. A method according to claim 19 wherein,
    antenna assemblies for generation of said first and said second sets of antenna beams are separated either spatially or with respect to different polarization directions.

21. Method according to claim 18, comprising the steps of:
    estimating the receiving channel so as to obtain a channel estimation, and estimating a sent signal with the aid of the channel estimation.

22. Method according to claim 18 wherein said receiving in one radio receiver branch comprises channel selection and transformation of the received signal from RF to a lower frequency.

23. Method according to claim 18, comprising the step of:
    estimating DOA on the basis of several combined and radio received signals derived from beams covering several space areas.

24. A radio receiving method comprising,
    providing a first set of antenna beams,
    providing a second set of antenna beams corresponding to said first set of antenna beams, characterized by the steps of:
  (a) receiving by said first antenna assembly a first set of signals and by said second antenna assembly means a second set of signals, each signal in the sets being derived from a corresponding antenna beam,
  (b) delaying of the second set of signals,
  (c) combining said first set of signals with said delayed second set of signals, each combination comprising a signal from said first set of signals and a signal from said delayed second set of signals, said signals both being derived from beams covering a corresponding space area,
  (d) radio receiving the combined signals.

25. Method according to claim 24 characterized by the steps of:
  (e) reducing correlation between the fading pattern of said first set of signals and the fading pattern of said second set of signals by means of antenna diversity.

26. Method according to claim 24 comprising the further steps of:
  (f) estimating the receiving channel so as to obtain a channel estimation, and
  (g) estimating a sent signal with the aid of the channel estimation and the signals obtained by the steps a–d.

27. Method according to claim 26 wherein a time equalizer or a Rake-receiver is used for steps f and g.

28. Method according to claim 24 wherein step d comprises channel selection, and transformation of the received signal from RF to a lower frequency.

29. Method according to claim 24 comprising the step of:
  (h) estimating DOA on the basis of signals received after carrying out step d.

30. A radio receiving method comprising the steps of:
  (a) receiving at least two sets of radio signal sequences wherein the fading pattern of a first of said sets of signal sequences is not fully correlated to the fading pattern of a second of said sets of signal sequences and the signal sequences in each of said sets of signal sequences being derived from antenna beams covering mainly different space areas,
  (b) delaying the sets of signal sequences relative each other,
  (c) combining of signal sequences derived from beams covering mainly the same space area,
  (d) radio receiving the combined signal sequences,
  (e) estimating DOA on the basis of the combined and radio received signal sequences, and
  (f) estimating a sent signal sequency on the basis of the combined and radio received signals sequences.

31. Method according to claim 30 wherein step d comprises channel selection, demodulation and transformation of the received signal from RF to a lower frequency.

* * * * *